(12) United States Patent
Wu

(10) Patent No.: US 10,272,643 B2
(45) Date of Patent: Apr. 30, 2019

(54) MULTI-LAYER SYNTHETIC GRAPHITE CONDUCTOR WITH PERIMETER WALL

(71) Applicant: Jones Tech (USA), Inc., Cupertino, CA (US)

(72) Inventor: Xiaoning Wu, Beijing (CN)

(73) Assignee: Jones Tech (USA), Inc., Cupertino, CA (US)

( * ) Notice: Subject to any disclaimer, the term of this patent is extended or adjusted under 35 U.S.C. 154(b) by 610 days.

(21) Appl. No.: 14/923,249

(22) Filed: Oct. 26, 2015

(65) Prior Publication Data

US 2017/0113438 A1    Apr. 27, 2017

(51) Int. Cl.
| | | |
|---|---|---|
| *B32B 9/00* | (2006.01) | |
| *B32B 3/04* | (2006.01) | |
| *B32B 15/04* | (2006.01) | |
| *B32B 15/20* | (2006.01) | |
| *B32B 27/36* | (2006.01) | |
| *B32B 7/12* | (2006.01) | |
| *B32B 7/00* | (2019.01) | |
| *B32B 27/06* | (2006.01) | |

(52) U.S. Cl.
CPC ............ *B32B 9/007* (2013.01); *B32B 3/04* (2013.01); *B32B 7/00* (2013.01); *B32B 7/12* (2013.01); *B32B 9/00* (2013.01); *B32B 15/04* (2013.01); *B32B 15/20* (2013.01); *B32B 27/06* (2013.01); *B32B 27/36* (2013.01); *B32B 2307/20* (2013.01); *B32B 2307/30* (2013.01); *B32B 2307/302* (2013.01)

(58) Field of Classification Search
CPC .......... B32B 9/007; B32B 3/04; B32B 15/04; B32B 15/20; B32B 27/36; B32B 7/12; B32B 7/00; B32B 9/00; B32B 27/06; B32B 2307/302; B32B 2307/20; B32B 2307/30
See application file for complete search history.

(56) References Cited

U.S. PATENT DOCUMENTS 4,867,235 A * 9/1989 Grapes ............... H01L 23/3733
165/185
2017/0067701 A1 * 3/2017 Sun ........................ F28F 21/02

* cited by examiner

*Primary Examiner* — Brian Handville

(57) ABSTRACT

A multi-layer synthetic graphite conductor. The multi-layer synthetic graphite conductor can include: a set of synthetic graphite sheets; and a perimeter wall for protecting the synthetic graphite sheets.

16 Claims, 3 Drawing Sheets

MULTI-LAYER SYNTHETIC GRAPHITE CONDUCTOR WITH PERIMETER WALL

BACKGROUND

Multi-layer synthetic graphite conductors can be employed as thermal conductors in a wide variety of electronic devices. For example, a multi-layer synthetic graphite conductor can be used to spread heat in a hand-held electronic device. A multi-layer synthetic graphite conductor can be used to transfer heat away from hot spots in an electronic device as well as perform heat transfer between components of an electronic device.

A multi-layer synthetic graphite conductor can include multiple synthetic graphite sheets covered by a protective film. A protective film covering can protect the synthetic graphite sheets from touch and prevent fragments from dropping off the synthetic graphite sheets.

In mass production, a protective film covering can create defects in a multi-layer synthetic graphite conductor. For example, a protective film covering can create wrinkles at every corner of a multi-layer synthetic graphite conductor, and can make the tolerances difficult to control, and create a poor cosmetic appearance

SUMMARY

In general, in one aspect, the invention relates to a multi-layer synthetic graphite conductor. The multi-layer synthetic graphite conductor can include: a set of synthetic graphite sheets; and a perimeter wall for protecting the synthetic graphite sheets.

In general, in another aspect, the invention relates to a method for forming a multi-layer synthetic graphite conductor. The method can include: forming a set of synthetic graphite sheets; and forming a perimeter wall for protecting the synthetic graphite sheets.

Other aspects of the invention will be apparent from the following description and the appended claims.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION

Figure 1A:
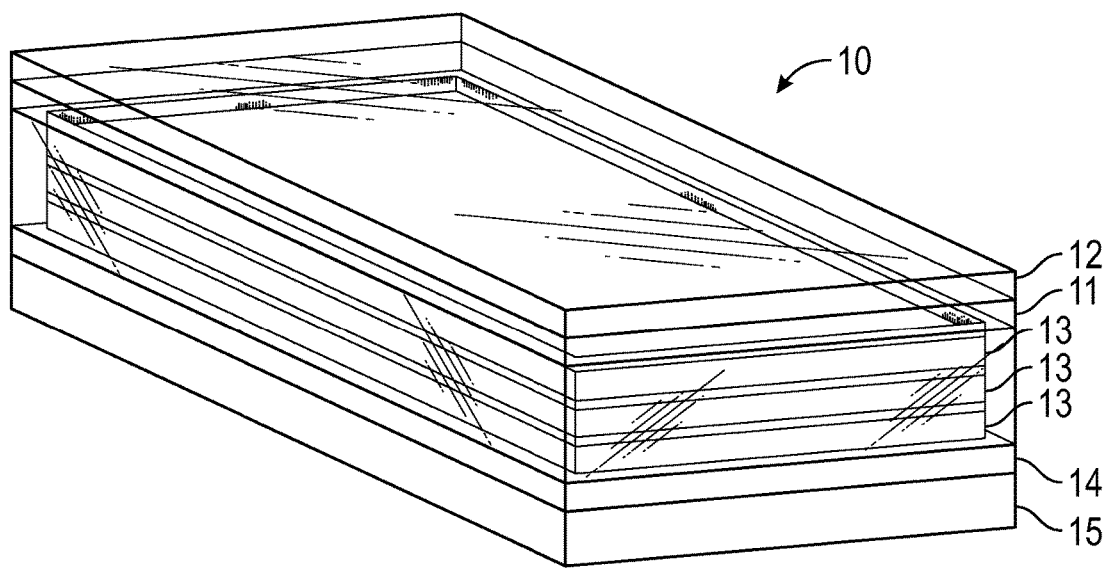
FIGS. 1A-1B illustrate a multi-layer synthetic graphite conductor in one or more embodiments.

Reference will now be made in detail to the various embodiments of the present disclosure, examples of which are illustrated in the accompanying drawings. Like elements in the various figures are denoted by like reference numerals for consistency. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, have not been described in detail so as not to unnecessarily obscure aspects of the present disclosure.

Figure 1B:
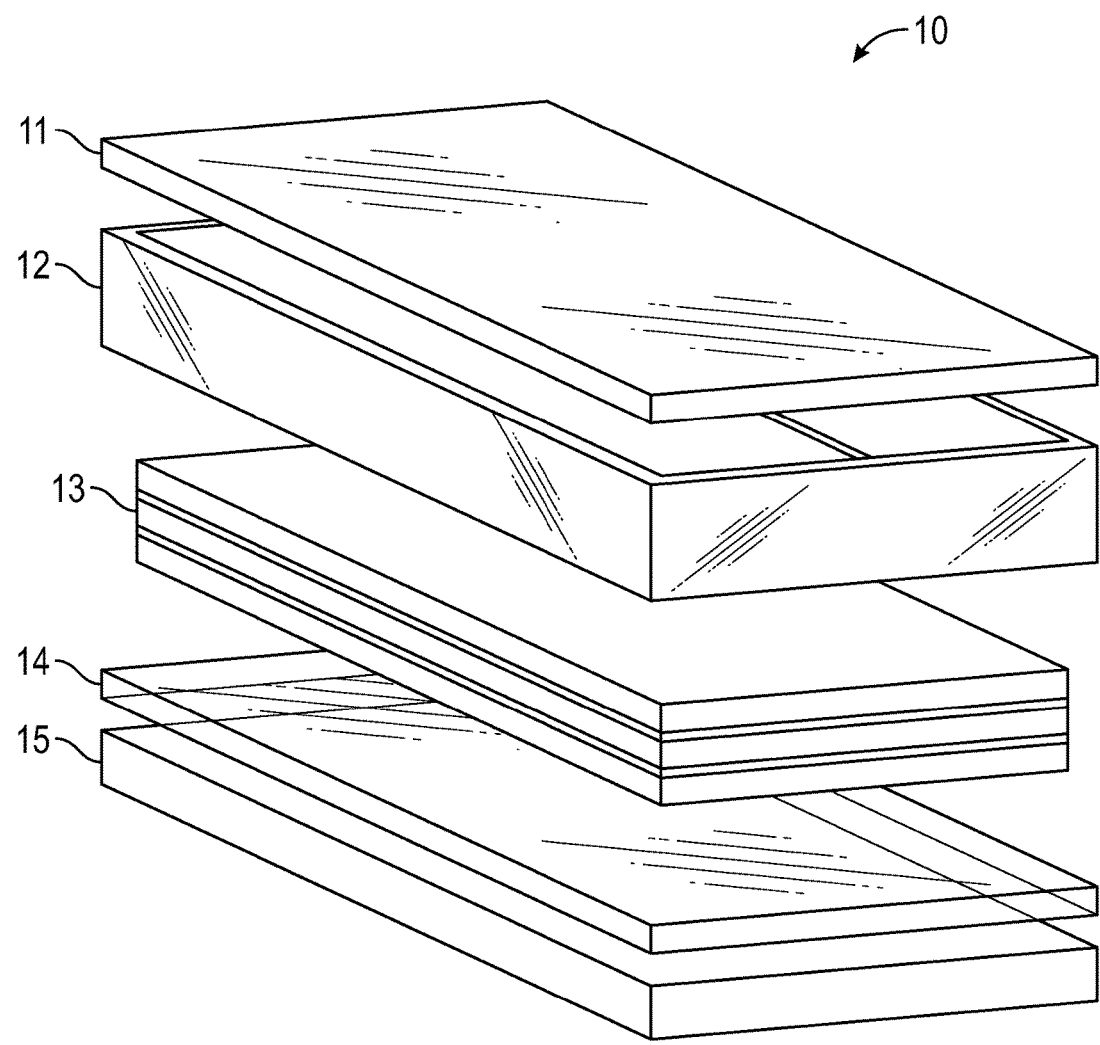

FIGS. 1A-1B illustrate a multi-layer synthetic graphite conductor 10 in one or more embodiments. FIG. 1A is a perspective view of the multi-layer synthetic graphite conductor 10. FIG. 1B is an exploded perspective view of the multi-layer synthetic graphite conductor 10. The multi-layer synthetic graphite conductor 10 includes a set of synthetic graphite sheets 13 and a perimeter wall 12 that encloses a periphery of the synthetic graphite sheets 13 and protects the exposed edges of the synthetic graphite sheets 13 from damage by touch.

There can be any number of the synthetic graphite sheets 13 in the multi-layer synthetic graphite conductor 10. In one or more embodiments, the multi-layer synthetic graphite conductor 10 can include a set of intervening bonding layers between the synthetic graphite sheets 13.

The design of the perimeter wall 12 can prevent the formation of wrinkles at corners of the synthetic graphite sheets 13. The design of the perimeter wall 12 can be selected to tightly control the tolerances along perimeter of the synthetic graphite sheets 13. The design of the perimeter wall 12 can achieve good cosmetic appearance. The design of the perimeter wall 12 can be improved peel strength as well as shear strength comparing with prior art designs, thereby achieving a more robust structure. The perimeter wall 12 can be selected to prevent peel forces from damaging the synthetic graphite sheets 13 during assembly of the multi-layer synthetic graphite conductor 10 and during installation of the multi-layer synthetic graphite conductor 10 in an electronics device.

The perimeter wall 12 can be a non-metal material. One example of a non-metal material for the perimeter wall 12 is polyethylene terephthalate (PET).

The perimeter wall 12 can be a metal material. Examples of a metal material for the perimeter wall 12 include aluminum, copper, and steel.

The multi-layer synthetic graphite conductor 10 in one or more embodiments includes a top protective layer 11. The top protective layer 11 can be a black PET single-sided adhesive layer.

The multi-layer synthetic graphite conductor 10 in one or more embodiments is formed on a contact sheet 15 via an adhesive layer 14. The contact sheet 15 as an adhesive cover liner can be a plastic film, or a paper film. The adhesive layer 14 can be a double-sided adhesive.

In one or more embodiments, the perimeter wall 12 can facilitate heat transfer among the synthetic graphite sheets 13. For example, the perimeter wall 12 made of metal can increase the thermal conductivity of the multi-layer synthetic graphite conductor 10 by thermally coupling exposed cut edges of the synthetic graphite sheets 13.

Figure 2:
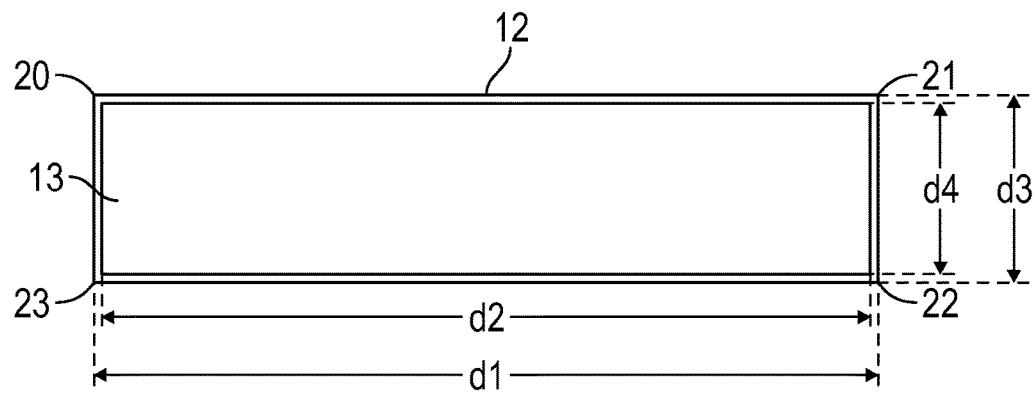
FIG. 2 is a top view of a multi-layer synthetic graphite conductor in one or more embodiments.

FIG. 2 is a top view of the multi-layer synthetic graphite conductor 10 in one or more embodiments. The perimeter wall 12 is formed with a set of peripheral dimensions d1 and d3 greater than a corresponding set of peripheral dimensions d2 and d4 of the synthetic graphite sheets 13 so that the synthetic graphite sheets 13 are fitted into the perimeter wall 12.

The perimeter wall 12 substitute to the prior art designs along the perimeter prevent formation of wrinkles at each of a set of corners 20-23 of the synthetic graphite sheets 13.

In one or more embodiments, the perimeter wall 12, as opposed to a prior art design at the perimeter, yields a clear cut at each of the corners 20-23 of the synthetic graphite sheets 13. The clear cuts at the corners 20-23 prevent difficulty in controlling the tolerances at the corners 20-23. In addition, the clear cuts at the corners 20-23 create a good cosmetic appearance.

Figure 3:
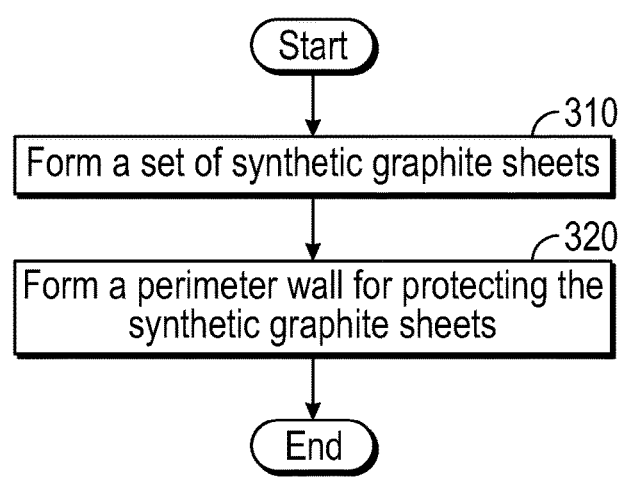
FIG. 3 illustrates a method for forming a multi-layer synthetic graphite conductor in one or more embodiments.

FIG. 3 illustrates a method for forming a multi-layer synthetic graphite conductor in one or more embodiments. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 3 should not be construed as limiting the scope of the invention.

At step 310, a set of synthetic graphite sheets are formed. The synthetic graphite sheets can be cut from larger sheets of synthetic graphite and bonded together with intervening adhesive layers.

At step 320, a perimeter wall is formed for protecting the synthetic graphite sheets. The perimeter wall can be cut to a set of peripheral dimensions selected to protect edges of the synthetic graphite sheets while providing spaces between the perimeter wall and the synthetic graphite sheets that prevent mechanical stresses on the synthetic graphite sheets.

While the foregoing disclosure sets forth various embodiments using specific diagrams, flowcharts, and examples, each diagram component, flowchart step, operation, and/or component described and/or illustrated herein may be implemented, individually and/or collectively, using a range of processes and components.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While the invention has been described with respect to a limited number of embodiments, those skilled in the art, having benefit of this disclosure, will appreciate that other embodiments may be devised which do not depart from the scope of the invention as disclosed herein.

What is claimed is:

1. A multi-layer synthetic graphite conductor, comprising:
   a stack of synthetic graphite sheets having a shape defined by a set of cut edges of the synthetic graphite sheets; and
   a wall formed around a perimeter of the stack parallel to the cut edges of the synthetic graphite sheets such that the wall encloses and protects the cut edges from mechanical damage.

2. The multi-layer synthetic graphite conductor of claim 1, wherein the wall has a set of peripheral dimensions selected to prevent a mechanical stress on the synthetic graphite sheets.

3. The multi-layer synthetic graphite conductor of claim 1, wherein the wall comprises a non-metal material.

4. The multi-layer synthetic graphite conductor of claim 3, wherein the non-metal material comprises polyethylene terephthalate (PET).

5. The multi-layer synthetic graphite conductor of claim 1, wherein the wall comprises a metal material.

6. The multi-layer synthetic graphite conductor of claim 5, wherein the metal material comprises aluminum.

7. The multi-layer synthetic graphite conductor of claim 5, wherein the metal material comprises copper.

8. The multi-layer synthetic graphite conductor of claim 5, wherein the metal material comprises steel.

9. A method for forming a multi-layer synthetic graphite conductor, comprising:
   forming a stack of synthetic graphite sheets having a shape defined by a set of cut edges of the synthetic graphite sheets; and
   forming a wall around a perimeter of the stack parallel to the cut edges of the synthetic graphite sheets such that the wall encloses and protects the cut edges from mechanical damage.

10. The method of claim 9, wherein forming a wall comprises selecting a set of peripheral dimensions for the wall to prevent a mechanical stress on the synthetic graphite sheets.

11. The method of claim 9, wherein forming a wall comprises forming a wall from a non-metal material.

12. The method of claim 9, wherein forming a wall comprises forming a wall from a polyethylene terephthalate (PET) material.

13. The method of claim 9, wherein forming a wall comprises forming a wall from a metal material.

14. The method of claim 9, wherein forming a wall comprises forming a wall from aluminum.

15. The method of claim 9, wherein forming a wall comprises forming a wall from copper.

16. The method of claim 9, wherein forming a wall comprises forming a wall from steel.

* * * * *